(12) United States Patent
Satish et al.

(10) Patent No.: US 10,063,587 B2
(45) Date of Patent: Aug. 28, 2018

(54) MANAGEMENT OF SECURITY ACTIONS BASED ON COMPUTING ASSET CLASSIFICATION

(71) Applicant: SPLUNK INC., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 14/956,589

(22) Filed: Dec. 2, 2015

(65) Prior Publication Data
US 2016/0164895 A1    Jun. 9, 2016

Related U.S. Application Data

(60) Provisional application No. 62/106,837, filed on Jan. 23, 2015, provisional application No. 62/106,830, (Continued)

(51) Int. Cl.
*H04L 29/06* (2006.01)
*G06F 21/55* (2013.01)
(Continued)

(52) U.S. Cl.
CPC .... *H04L 63/1441* (2013.01); *G06F 17/30598* (2013.01); *G06F 21/554* (2013.01);
(Continued)

(58) Field of Classification Search
CPC ............ H04L 63/1441; H04L 63/1433; H04L 63/1425; H04L 63/0236; H04L 63/20;
(Continued)

(56) References Cited

U.S. PATENT DOCUMENTS 8,042,171 B1    10/2011  Nordstrom et al.
8,103,875 B1    1/2012   Ramzan et al.
(Continued)

OTHER PUBLICATIONS

Paudice, Andrea; Sarkar, Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.
(Continued)

*Primary Examiner* — Eleni A Shiferaw
*Assistant Examiner* — Cheng-Feng Huang

(57) ABSTRACT

Systems, methods, and software described herein provide for responding to security threats in a computing environment based on the classification of computing assets in the environment. In one example, a method of operating an advisement computing system includes identifying a security threat for an asset in the computing environment, and identifying a classification for the asset in relation to other assets within the computing environment. The method further provides determining a rule set for the security threat based on the classification for the asset and initiating a response to the security threat based on the rule set.

14 Claims, 5 Drawing Sheets

Related U.S. Application Data filed on Jan. 23, 2015, provisional application No. 62/087,025, filed on Dec. 3, 2014.

(51) Int. Cl.
*G06F 17/30* (2006.01)
*H04L 12/851* (2013.01)

(52) U.S. Cl.
CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(58) Field of Classification Search
CPC ............. H04L 63/1416; H04L 47/2425; G06F 21/554; G06F 17/30598
See application file for complete search history.

(56) References Cited

U.S. PATENT DOCUMENTS

| | | | |
|---|---|---|---|
| 8,185,953 B2 | 5/2012 | Rothstein et al. |
| 8,261,317 B2 | 9/2012 | Litvin et al. |
| 8,291,495 B1 | 10/2012 | Burns et al. |
| 8,484,338 B2 | 7/2013 | Paster |
| 8,627,466 B2 | 1/2014 | Fisher |
| 8,676,970 B2 | 3/2014 | Boyns et al. |
| 8,756,697 B2 | 6/2014 | Ocepek et al. |
| 8,856,910 B1 | 10/2014 | Rostami-Hesarsorkh et al. |
| 8,914,878 B2 | 12/2014 | Burns et al. |
| 8,924,469 B2 | 12/2014 | Raleigh et al. |
| 8,943,123 B2 | 1/2015 | Miyazaki et al. |
| 8,949,931 B2 | 2/2015 | Ermagan et al. |
| 9,009,824 B1 | 4/2015 | Chen et al. |
| 9,049,226 B1 | 6/2015 | Duane |
| 9,166,995 B1 | 10/2015 | Roundy |
| 9,256,739 B1 | 2/2016 | Roundy |
| 9,311,479 B1 | 4/2016 | Manni et al. |
| 9,325,733 B1 | 4/2016 | Kolman |
| 9,489,516 B1 | 11/2016 | Lu et al. |
| 2004/0003286 A1 | 1/2004 | Kaler |
| 2004/0054498 A1 | 3/2004 | Shipp |
| 2004/0111637 A1 | 6/2004 | Baffes et al. |
| 2005/0055578 A1 | 3/2005 | Wright et al. |
| 2005/0235360 A1 | 10/2005 | Pearson |
| 2006/0048209 A1 | 3/2006 | Shelest |
| 2006/0117386 A1 | 6/2006 | Gupta et al. |
| 2008/0005782 A1 | 1/2008 | Aziz |
| 2008/0289028 A1 | 11/2008 | Jansen et al. |
| 2010/0162347 A1 | 6/2010 | Barile |
| 2010/0251329 A1 | 9/2010 | Wei |
| 2010/0319004 A1 | 12/2010 | Hudson |
| 2010/0325685 A1 | 12/2010 | Sanbower |
| 2012/0331553 A1 | 12/2012 | Aziz et al. |
| 2013/0007882 A1 | 1/2013 | Devarajan et al. |
| 2013/0081141 A1 | 3/2013 | Anurag |
| 2013/0291106 A1 | 10/2013 | Simonoff |
| 2014/0082726 A1 | 3/2014 | Dreller et al. |
| 2014/0165207 A1 | 6/2014 | Engel |
| 2014/0237599 A1 | 8/2014 | Gertner |
| 2014/0259170 A1 | 9/2014 | Amsler |
| 2014/0310811 A1 | 10/2014 | Hentunen |
| 2014/0344926 A1 | 11/2014 | Cunningham |
| 2014/0351441 A1 | 11/2014 | Madani et al. |
| 2015/0215325 A1 | 7/2015 | Ogawa |
| 2015/0222647 A1 | 8/2015 | Lietz et al. |
| 2015/0334132 A1* | 11/2015 | Zombik ............... H04L 41/28 726/1 |
| 2015/0341384 A1 | 11/2015 | Mandayam et al. |
| 2015/0365438 A1 | 12/2015 | Carver |
| 2015/0381641 A1* | 12/2015 | Cabrera ............ H04L 63/1425 726/23 |
| 2016/0006749 A1 | 1/2016 | Cohen et al. |
| 2016/0072836 A1 | 3/2016 | Hadden |
| 2016/0103992 A1 | 4/2016 | Roundy |
| 2016/0119379 A1 | 4/2016 | Nadkarni |
| 2016/0164893 A1 | 6/2016 | Levi |
| 2017/0237762 A1 | 8/2017 | Ogawa |

OTHER PUBLICATIONS

Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.
Non Final Office Action for U.S. Appl. No. 14/677,493, dated Aug. 24, 2017, 21 pages.

* cited by examiner

MANAGEMENT OF SECURITY ACTIONS BASED ON COMPUTING ASSET CLASSIFICATION

RELATED APPLICATIONS

This application is related to and claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, and which are hereby incorporated by reference in their entirety.

TECHNICAL FIELD

Aspects of the disclosure are related to computing environment security, and in particular to implementing security actions in a computing environment.

TECHNICAL BACKGROUND

An increasing number of data security threats exist in the modern computerized society. These threats may include viruses or other malware that attacks the local computer of the end user, or sophisticated cyber-attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs and other security identifying systems may generate security alerts for devices within the network, administrators may be forced to identify background information about each of the threats, and translate the gathered information into security actions. Thus, time and resources that could be used on other tasks may be used in researching and determining an appropriate course of action to handle a security threat.

Overview

The technology disclosed herein enhances how security threats are responded to in a computing environment. In one implementation, a method of operating an advisement system to respond to security threats in a computing environment includes identifying a security threat for an asset in the computing environment, and identifying a classification for the asset in relation to other assets within the computing environment. The method further provides determining a rule set for the security threat based on the classification for the asset, and initiating a response to the security threat based on the rule set.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
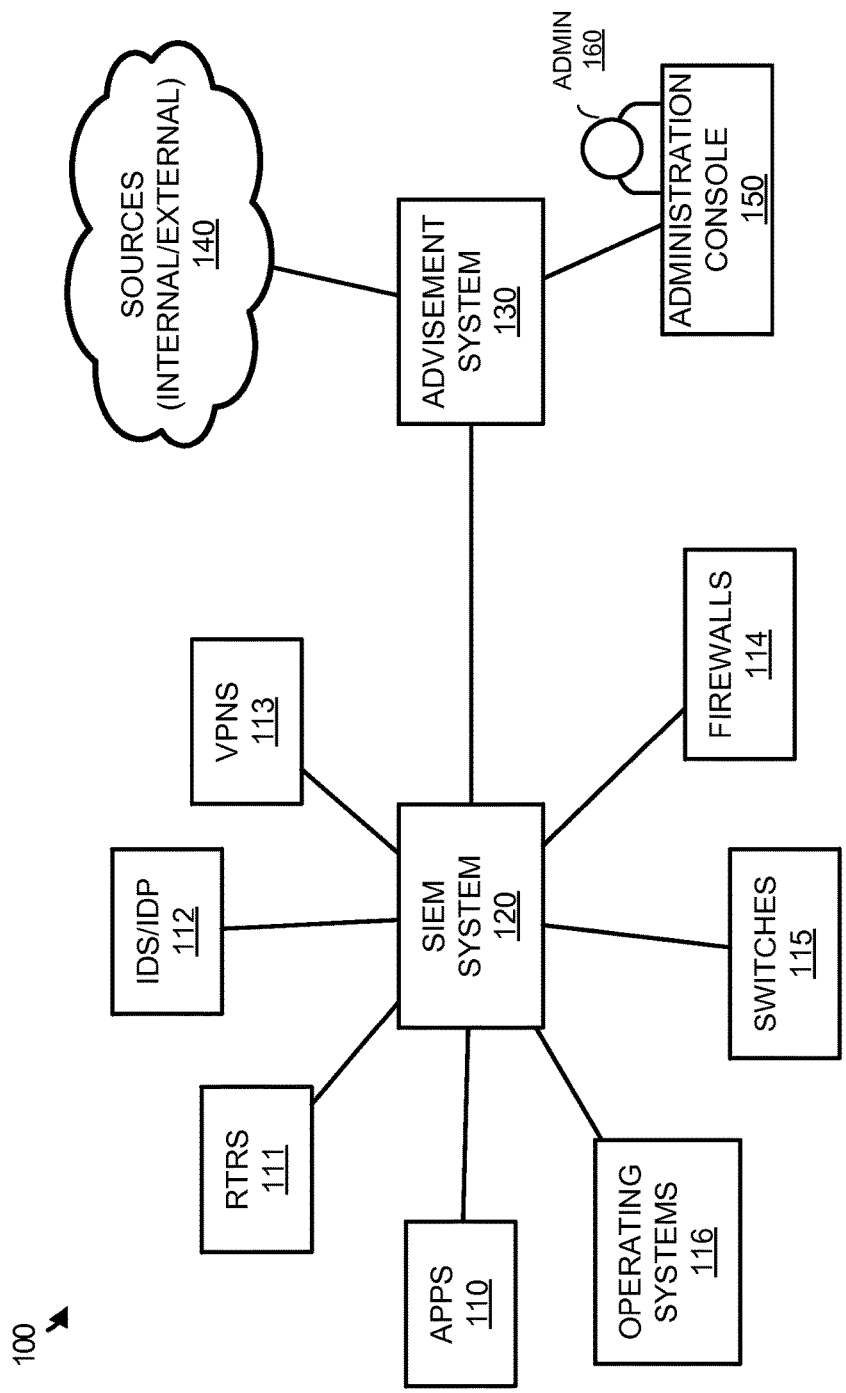
FIG. 1 illustrates a computing environment to provide responses to security threats based on computing asset classification.

The various examples disclosed herein provide for generating responses to security threats based on classifications of computing assets. In many situations, organizations may employ a variety of computing assets, which may include various hardware and software configurations. During the operation of the computing assets, security incidents or threats may occur, which inhibit the operation of the assets and the environment as a whole. To take actions against the security threats, an advisement system may be coupled to the computing environment, which is capable of identifying security threats within the environment and taking actions against the identified threats.

In particular, the advisement system may obtain reports of security threats from users of computing assets in the computing environment, security information and event management (SIEM) system reports of threats in the computing environment, computing asset reports of threats in the computing environment, or any other similar reports of security threats. In response to a security threat, the advisement system may gather supplemental information about the threat to determine the functionality and severity that the threat poses to the environment. For example, the advisement system may query internal and external databases and websites to determine what type and how severe the security threat is to the organization's assets.

Once a threat is identified, the advisement system may determine a classification for assets that are affected by a threat. In some implementations, the classification may include a provider classification for computing assets that provide data to other assets in the environment, or a consumer classification for computing assets that receive data from other assets in the environment. In particular, the provider and consumer classifications may be determined during the normal operation of the computing environment, or operation prior to the identification of the threat, to determine what communications are typically required for each computing asset. For example, a serving computer may have a large amount of outbound data, whereas an end user computing system may have a large amount of inbound data.

Accordingly, because each of the systems possess different communication habits, different security actions may be more effective in limiting or eliminating a particular security threat. In some implementations, the classification may be based on the current state of the threat, such as whether the assets are the target of an attack, whether the assets are the source of an attack, or whether the assets are infrastructure elements, such as switches, routers, or some other infrastructure element. Based on the classification of the affected assets, a rule set may be determined for the threat and a response to the security threat may be initiated. In some implementations, the advisement system may access at least one data structure that stores the rule sets. These rule sets may be associated with or include various response information for a threat including actions to be taken against a threat, an administrator identifier for an administrator to manage the threat or the affected asset, information about whether an administrator must prescribe any actions against the threat, or any other similar response information for threats in the environment.

In some implementations, in addition to classifying the asset and the role that the asset is playing in the environment, the advisement system may further determine a criticality rating for the asset. This criticality rating may be specified for the computing asset when the asset is initiated in the environment, based on the users that have access to the computing asset, based on the data that is available to the computing asset, or based on any other similar criticality rating. The rating may comprise a numeric rating, a letter rating, or some other rating system. In particular, the more critical that a computing asset is the more drastic the response to the security threat may be. For example, a computing asset that belonged to a financial officer in a corporation may have a higher rating than a computing system belonging intern to the corporations. As a result, if the same threat were identified on both computing systems, the action response to the threat may be more drastic on the financial officer computing asset over the interns computing asset. These security actions may include monitoring the threat, removing the threat from the system, blocking particular internet protocol (IP) address, blocking particular domain names, placing a computing asset into a virtual local area network (VLAN), or some other similar security action.

To further illustrate the operation of an advisement system within a computing network, FIG. 1 is provided. FIG. 1 illustrates a computing environment 100 to provide responses to security threats based on computing asset classification. Computing environment 100 includes computing assets 110-116, SIEM system 120, advisement system 130, sources 140, and administration console 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual computing systems, such as virtual machines executing via host computing systems. These physical and virtual computing systems may include an operating system, applications, processes, firewalls, and other similar computing resources.

SIEM system 120, advisement system 130, internal and external sources 140, and administration console 150 may each include communication interfaces, network interfaces, processing systems, computer systems, microprocessors, storage systems, storage media, or some other processing devices or software systems, and can be distributed among multiple devices. SIEM system 120, advisement system 130, and sources 140 may comprise one or more server, desktop, laptop, or other similar computing devices. Administration console 150 may comprise an end user device, such as a desktop computer, laptop computer, smartphone, tablet, or any other similar computing device.

Advisement system 130 communicates with SIEM system 120, sources 140, and administration console 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, SIEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions, or to receive an incident report.

In operation, SIEM system 120 receives data and performance information from assets 110-116 and performs inspections to identify possible security threats. Once SIEM system 120 identifies a possible security threat, information about the security threat is transferred to advisement system 130. Advisement system 130 identifies the security threat and analyzes the threat to determine an appropriate action to be taken against the threat. In some implementations, to determine the appropriate action against the threat, advisement system 130 may determine a classification for assets related to the threat. This classification may be based on the normal communication habits of the assets, the role that the assets are playing in providing the security threat, or some other classification. Additionally, in some implementations, advisement system 130 may also determine the criticality of each of the computing assets. Once the classifications and the criticality are determined for the assets, a rule set may be determined for the threat, wherein the rule set may be associated with a response to the threat.

Figure 2:
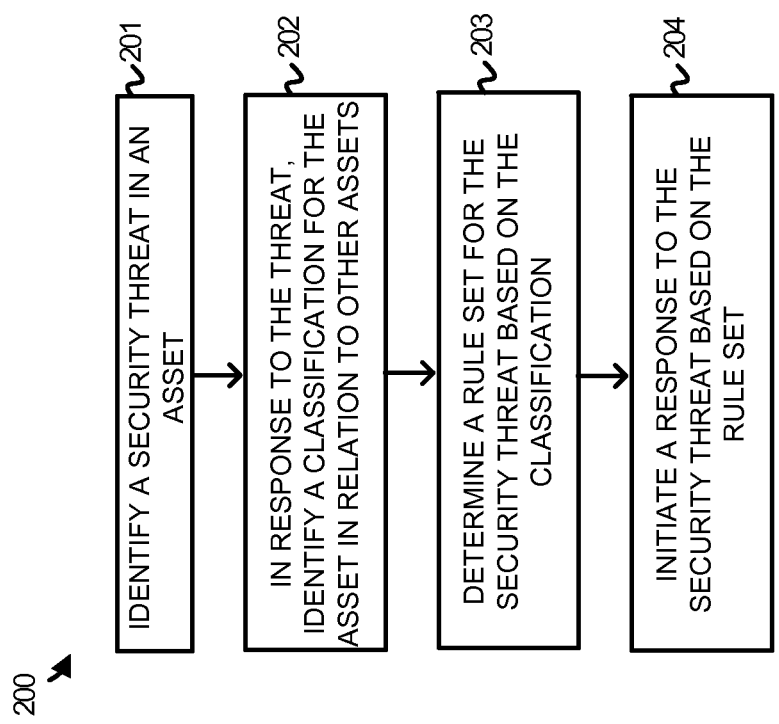
FIG. 2 illustrates a method of operating an advisement system to provide responses to security threats based on computing asset classification.

To further illustrate the operation of computing environment 100, FIG. 2 is provided. FIG. 2 illustrates a method 200 of operating an advisement system to provide responses to security threats based on computing asset classification. In particular, as described in FIG. 1, SIEM system 120 receives information from a plurality of network assets 110-116 and identifies security threats based on the information. Once a threat is identified for an asset in computing environment 100, the threat is transferred to advisement system 130. Advisement system 130 identifies the security threat or incident for the asset within computing environment 100 (201). In response to the security threat, the method includes identifying a classification for the asset in relation to the other assets of computing environment 100 (202). Once the asset is classified, method 200 provides for determining a rule set for the security threat based on the classification (203), and also provides initiating a response to the security threat based on the rule set (204).

In some examples, the response may include an automated response by the advisement system to direct security actions to the computing asset. These actions may include actions to segregate the computing asset, remove a particular process from the computing asset, block a particular IP address on the computing asset, or any other similar action. In some instances, the response may include providing one or more security action recommendations to an administrator, allowing the administrator to make a selection of at least one action to be implemented for the asset. These action recommendations may be displayed directly on advisement system 130, or may be transferred to administration console 150 for display. Once an action is selected, advisement system 130 initiates the processes necessary to implement the action in the asset.

In some implementations, to determine the classification of a particular asset, advisement system 130 may maintain records of the communication interactions or netflow of the various assets within the computing environment. This netflow determination, which is determined during normal operation of the computing environment, accounts for a ratio of incoming data communications to outgoing data communications for each of the computing assets. For example, a server may have more outgoing data than incoming data, whereas an end user device may have a greater amount of incoming data connections than outgoing data connections. As a result of this netflow, it may be more desirable to apply a first action in a consumer asset, and second action in a provider asset. For example, if a serving computing asset is identified based on the netflow, advisement system 130 may restrict incoming data communications, while allowing the serving computing asset to provide outgoing data. This allows the serving computing asset to remain operational, while limiting the possible effects of an identified security threat.

In some implementations, to determine the classification of the particular asset, advisement system 130 may determine whether the asset is a target asset, a source asset, or an infrastructure asset for the identified security threat. A target asset comprises an asset that is targeted for a particular threat, such as destination computing system for a virus, or some other malicious process. A source asset comprises an asset that is attempting to provide a security threat to other assets and computing systems, such as a denial of service computing system, a virus distributer, or some other similar asset. An infrastructure asset comprises an asset that facilitates the transmission of a threat, such as a router, a switch, or some other similar computing asset. Based on the operation that the asset provides with respect to the security threat, advisement system 130 may change the response to the security threat. For example, if an asset is a target asset, the response may include blocking future communications from the source of the threat, or removing one or more processes on the asset if the threat is local to the target. In contrast, if the device is a source asset, advisement system 130 may segregate the asset from other assets in the environment to prevent the device from communicating and spreading the security threat.

In some examples, in addition to or in place of the classification of the computing assets, a criticality rating may be defined for each of the assets. This criticality rating, which may be defined by an administrator, defined by the user of the computing asset, defined by the data stored on the computing asset, or defined in any other similar manner, may allow advisement computing system to differentiate between the responses that are proposed for each threat. For example, a file server that is accessed by all employees of a corporation may possess a much higher criticality rating than a computing asset that provides music for the workplace. Accordingly, the actions that are provided for the server may include actions to limit the threat, but continue to provide services to the requesting employees, whereas the music computing asset may be provided actions to prevent future operation, or segregate the device from the network until the threat is removed.

As illustrated in FIG. 1, advisement system 130 may further communicate with internal and external sources 140 to determine supplementary information about a security threat. These sources, which may include websites, databases and the like, store information about possible threats within computing environments. To query the databases, advisement system 130 may receive a notification of a security threat within one of the assets of the computing environment, wherein the notification includes information about the threat, such as IP addresses associated with the threat, process names associated with the threat, domain names associated with the threat, or any other similar information. Based on the notification, advisement system 130 may request supplementary information from sources 140. Once the supplementary information is received, advisement system 130 may use the supplementary information along with the classification and criticality rating for the asset to determine an appropriate rule set for the security threat. Once the rule set is determined, in some examples by searching data structures that store a plurality of rule sets, advisement system 130 may initiate a response to the threat.

Although illustrated in FIG. 1 with a SIEM system, it should be understood that in some examples other systems, such as the assets within the computing environment, might be used to identify security threats. Further, although illustrated separate in the example of FIG. 1, it should be understood that SIEM system 120 might reside wholly or partially on the same computing systems as advisement system 130.

Figure 3:
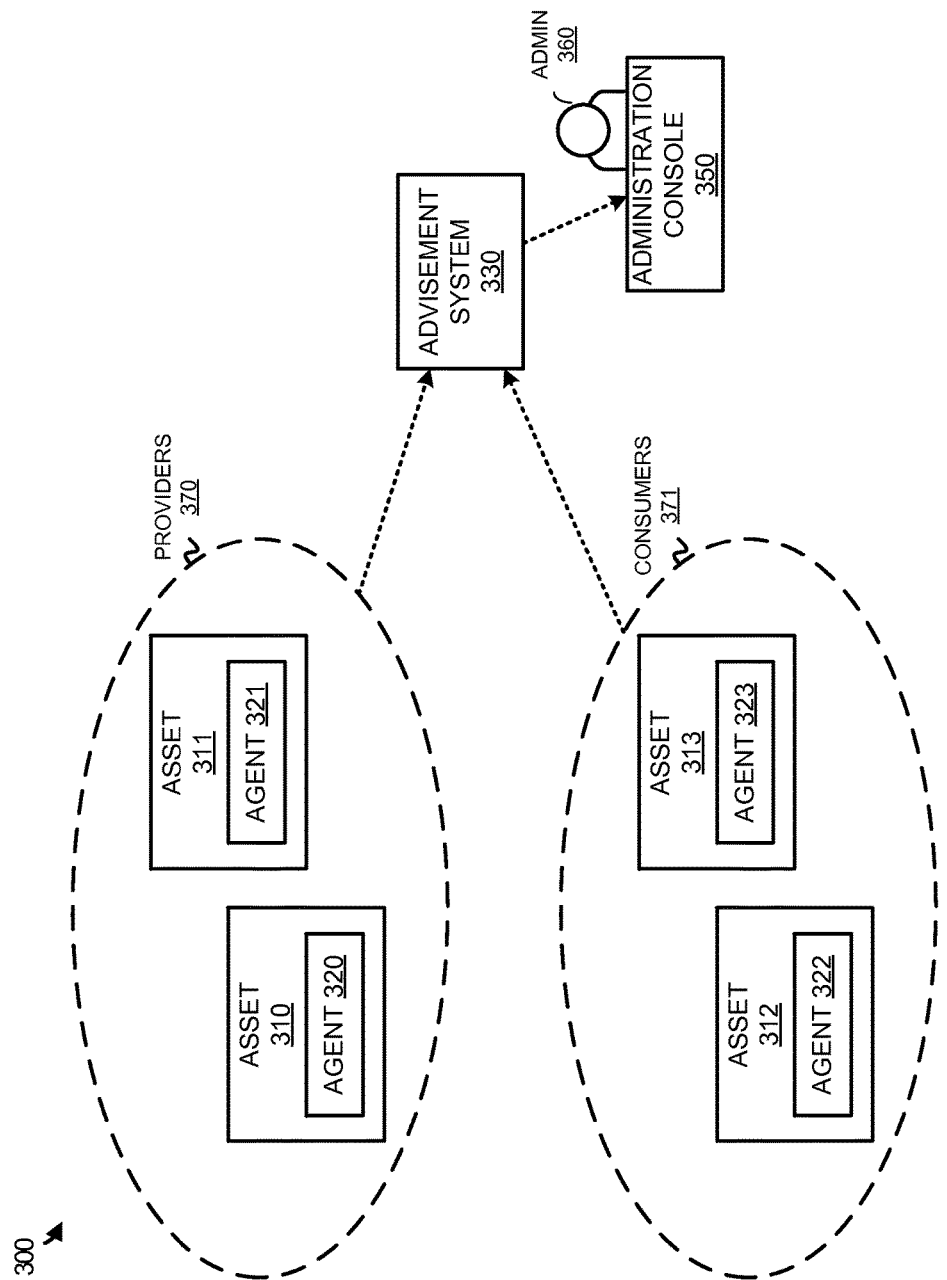
FIG. 3 illustrates an overview of providing responses to security threats based on computing asset classification.

Referring now to FIG. 3, FIG. 3 illustrates an overview 300 of providing responses to security threats based on computing asset classification. Overview 300 includes assets 310-313, advisement system 330, administration console 350, and administrator 360. Assets 310-313 further include agents 320-323, which report data flow information back to advisement system 330. Assets 310-313 may comprise serving computing systems, desktop computing systems, laptop computing systems, switches, routers, and other similar computing systems, including combinations and virtual representations thereof.

In operation, agents 320-323 monitor communication flow for each of computing assets 310-313. This information may include the amount of incoming connections to an asset, the amount of incoming data to an asset, the amount of outgoing connections from an asset, the amount of outgoing data from an asset, and other similar data flow information. This information is then reported back to advisement system 330, allowing advisement system 330 to classify each of the assets, during normal operation of the computing environment, as providers 370, which make more outgoing communications than incoming communications, or consumers 371, which receive more incoming communication than outgoing communications.

During operation of the computing assets, advisement system 330 may identify a security threat associated with an asset within the computing environment. In response to the threat, advisement system 330 identifies whether the asset is a provider 370 or a consumer 371, and determines a rule set for the security threat based on the classification. These rule sets may be stored in data structures accessible to advisement system 330, wherein a rule set may be selected from the data structure based at least in part on the classification of the asset. In some implementations, the rule sets in the data structures may be correspond to security actions to be taken against a threat, an administrator identifier for an administrator that manages the particular threat or the affected asset, information about whether an administrator must prescribe actions before they can be taken against the threat, or any other similar response information for threats in the environment. Once the rule set is determined, advisement system 130 initiates a response to the security threat based on the rule set. In some implementations, the response may include an automated response to the security threat for advisement system 130. For example, advisement system 130 may transfer a command to the computing asset to block a particular IP address. In some implementations, advisement system 130 may be configured to provide action suggestions that are accessible on advisement system 330 or on administration console 350. Once the action suggestions are identified, and provided to administrator 360, administrator 360 may select an action for an asset, allowing advisement system 330 to implement the selected action.

Figure 4:
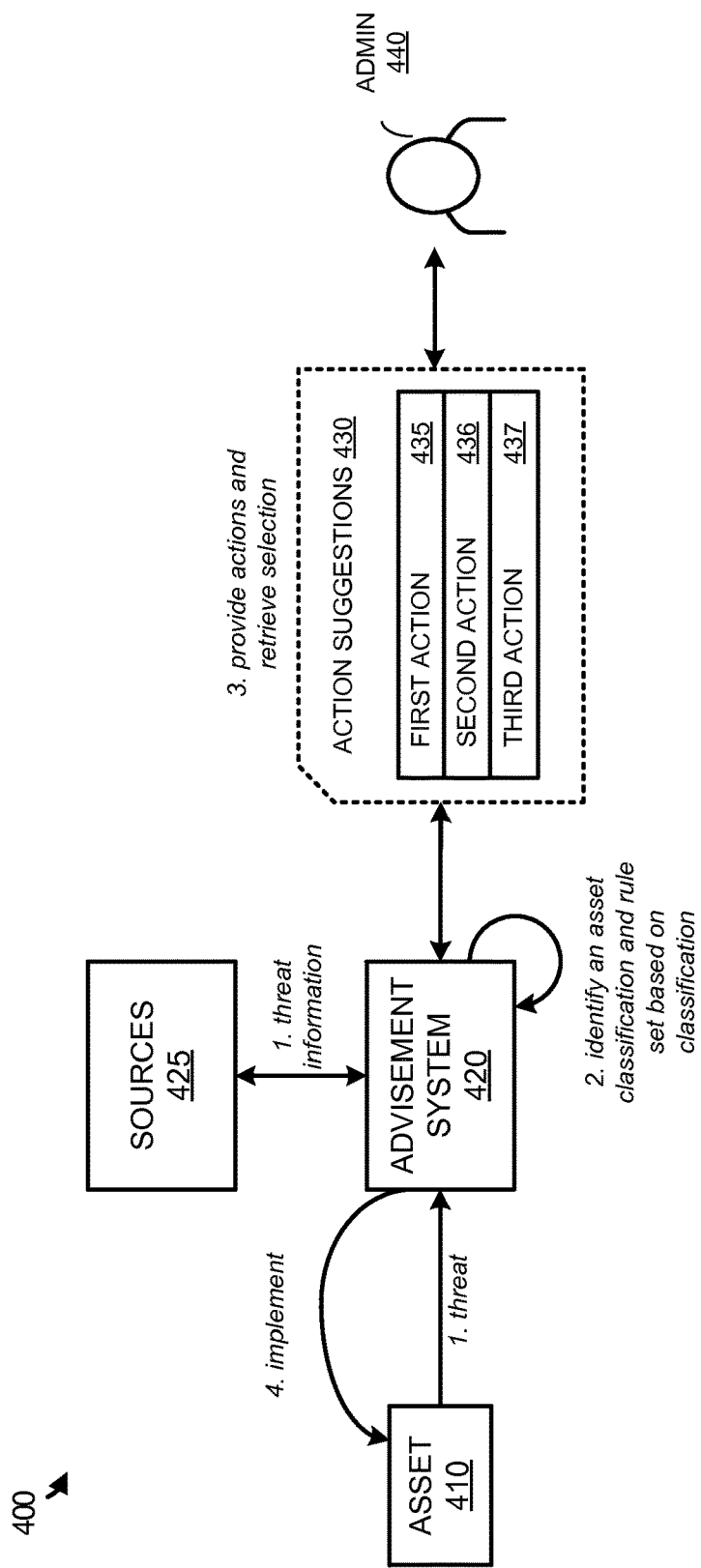
FIG. 4 illustrates an operational scenario of providing responses to security threats based on computing asset classification.

Referring now to FIG. 4, FIG. 4 illustrates an operational scenario 400 of providing responses to security threats based on computing asset classification. Operational scenario 400 includes asset 410, advisement system 420, sources 425, action suggestions 430, and administrator 440.

As described herein, organizations may employ computing networks with various computing assets, such as asset 410, to provide desired operations. During the operation of the computing assets, an asset in the computing environment may encounter a security threat that is reported to advisement system 420. This security threat may include, but is not limited to, an unknown process executing on the computing asset, one or more unknown communications from an IP address, or an unknown IP address communicating with the computing asset. Here, in addition to identifying the threat, advisement system 420 further retrieves threat information from sources 425. Sources 425 may include websites, databases, and other similar sources that can provide supplemental identifier information about a threat recognized for asset 410. For example, if an unknown process were identified in asset 410, sources 425 may be queried to determine supplemental information about the unknown process, such as whether the threat is malicious, what types of data are sought by the threat, and other similar information.

Once the threat is identified for asset 410, advisement system 420 identifies an asset classification and rule set based on the classification. In some implementations, the classification of the asset may be based on the overall communication flow for the asset prior to the identification of the threat. This communication flow may classify the device as a provider or a consumer based on the amount of data transferred and received, the overall number of communications transferred and received, or other similar communication flow data. By determining the classification of the device based on the communications, security actions may be determined to allow continued operations of the asset while preventing or limiting the advancement of the security threat. Accordingly, if asset 410 were classified as a provider, the security actions identified for the threat may be different than if asset 410 were a consumer.

In addition to or in place of identifying the communication traits of the asset prior to the identification of the security threat, advisement system 420 may further determine the role that the asset is providing for the threat. These roles may include a target for the threat, a source of the threat, or an infrastructure point for the threat connecting one or more computing assets. To determine the role of the threat, advisement system 420 may gather various information about the threat, such as whether the threat is communicating with other assets, whether the threat is collecting data, whether the threat is transmitting data to another device, or any other similar information gathered from the asset and/or an agent associated with the asset. Once the role of the asset is determined, rule sets and security actions may be defined for the threat based at least in part on the role of the asset. For example, if the threat is determined to a be a source of a threat based on the communication traits of the threat on the asset, a rule set may be identified to prevent outgoing communications from the asset.

In some implementations, advisement system 420 may further identify a criticality rating for the computing asset affected by the security threat. This criticality rating may be assigned by an administrator when the device was initiated, may be determined based on the criticality of the user associated with the asset, may be determined based on the data accessible on the asset, or may be defined in any other manner. The criticality rating may comprise a numerical value, a letter grade, or any other similar criticality rating that can be used to relate the criticality of the asset to other assets in the environment. Based on the criticality as well as the classification for the asset, a rule set may be determined for the particular asset.

Here, once a rule set is determined for the security threat, advisement system 420 may provide a response to the security threat based on the rule set. In particular, advisement system 420 may have access to one or more rule set data structures that can be used to identify a particular rule set based at least on the classification of the asset, the type of threat, and/or the criticality of the asset. These rule sets may be associated with security actions that can be implemented against the particular security threat. In this example, the security actions associated with the rule set comprise action suggestions 430 that can be provided to administrator 440. These action recommendations may be provided to administrator 440 locally advisement system 420, or may be provided externally at an administration console, such as a desktop computer, smartphone, or some other end user device.

Once the actions are provided, administrator 440 may select at least one action for of actions 435-437 to be implemented for asset 410. Advisement system 420 is configured to identify the selection made by administrator 440, and initiate implementation of the selected action in asset 410. In some implementations, the actions that are provided by administrator 440 may comprise unified action commands that can be translated into the required action processes for the individual asset. For example, a computing environment may employ computing assets with various hardware and software configurations. Accordingly, each of the assets within the environment may require a different set of processes for a security action to be implemented. Here, advisement system 420 may take the selection of administrator 440 and initiate a translation of the selection into the necessary processes specific to asset 410. In some examples, the translation of the security action may occur within advisement system 420. However, in other examples, the action selection may be forwarded to asset 410 to be translated and implemented by the asset.

Figure 5:
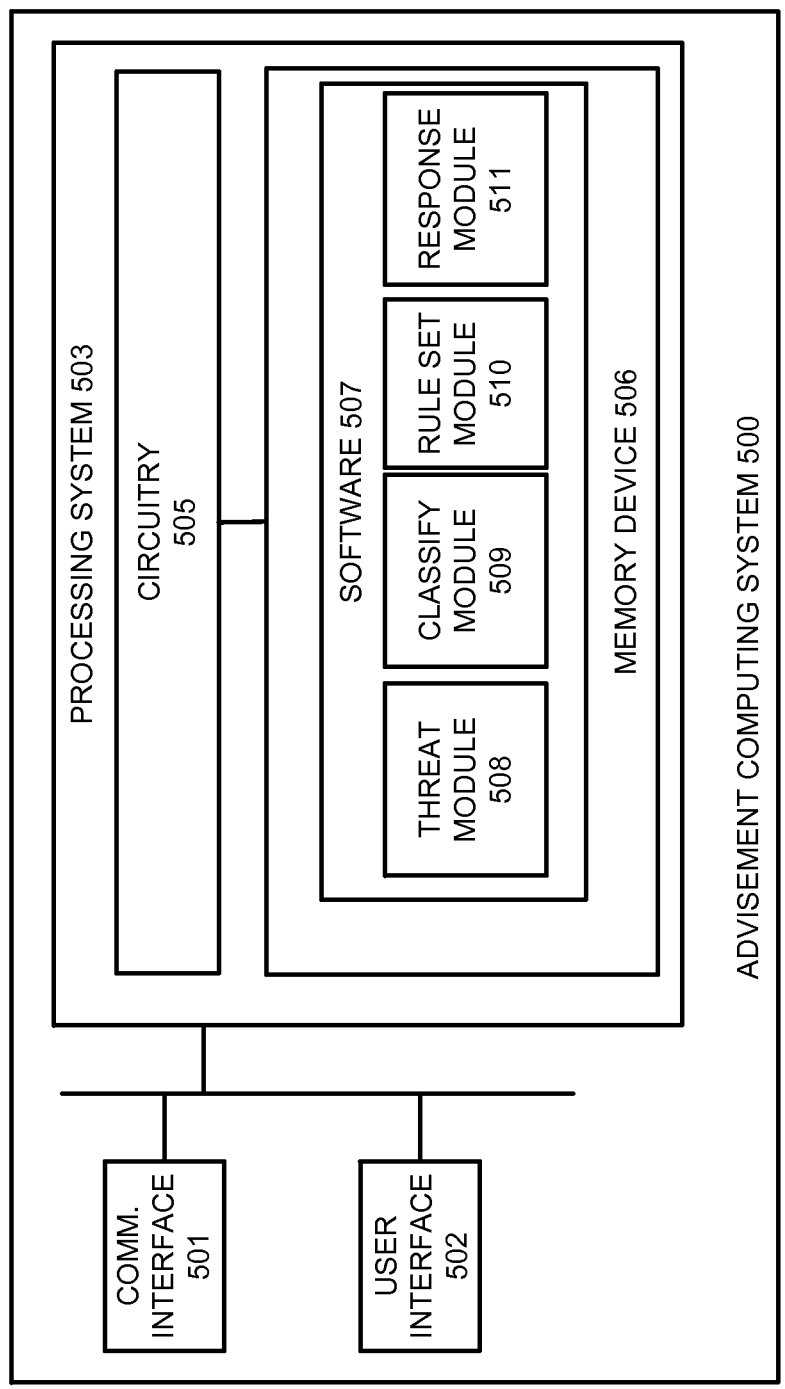
FIG. 5 illustrates an advisement computing system to provide responses to security threats.

FIG. 5 illustrates an advisement computing system 500 to provide responses to security threats. Advisement computing system 500 is representative of a computing system that may be employed in any computing apparatus, system, or device, or collections thereof, to suitably implement the advisement systems described herein in FIGS. 1-4. Specifically, advisement computing system 500 is representative of advisement systems 130, 330, and 420. Computing system 500 comprises communication interface 501, user interface 502, and processing system 503. Processing system 503 is communicatively linked to communication interface 501 and user interface 502. Processing system 503 includes processing circuitry 505 and memory device 506 that stores operating software 507.

Communication interface 501 comprises components that communicate over communication links, such as network cards, ports, radio frequency (RF) transceivers, processing circuitry and software, or some other communication devices. Communication interface 501 may be configured to communicate over metallic, wireless, or optical links. Communication interface 501 may be configured to use time-division multiplexing (TDM), IP, Ethernet, optical networking, wireless protocols, communication signaling, or some other communication format—including combinations thereof. In particular, communication interface 501 may communicate with assets, security monitoring systems, and administration consoles to implement security actions. In some implementations, communication interface 501 may further communicate with internal and external sources, such as databases and websites, to identify supplementary information about the security threat. This identification of supplementary information may include determining whether a process is malicious, determining if an IP address is malicious, determining if a website is associated with a security threat, or any other similar information related to a security threat identified within a computing environment.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes threat module 508, classify module 509, rule set module 510, and response module 511, although any number of software modules may provide the same operation. Operating software 507 may further include an operating system, utilities, drivers, network interfaces, applications, or some other type of software. When executed by circuitry 505, operating software 507 directs processing system 503 to operate advisement computing system 500 as described herein.

In particular, threat module 508 directs processing system 503 to identify a security threat for a computing asset within a computing environment. This identification of the threat maybe derived from the computing asset, a security monitoring system in the computing environment, or some other threat monitoring system. In some implementations, in addition to receiving a notification of the threat, the process of identifying the threat may include querying websites and other similar databases to determine supplementary information about the threat. For example, a threat may be reported for an asset because of an unknown process executing on the asset. In response to be notified of the threat, computing system 500 may query sources to determine information about the threat including whether the process is malicious, the source of the process, or any other similar information.

In addition to identifying the threat, classify module 509 directs processing system 503 to identify a classification of the asset in relation to other assets in the computing environment, while rule set module 510 directs processing system 503 to determine a rule set based on the classification. Once the rule set is identified, response module 511 directs processing system 503 to initiate a response to the security threat based on the rule set.

In some implementations, to define the classification for the computing asset, computing system 500 may manage information about the data flow for the assets in the environment. In particular, computing system 500 may define assets as providers or consumers based on the data flow for the particular asset. For example, an asset that has a greater number of outgoing connections than incoming connections may be considered a provider, whereas an asset with a greater number of incoming connections than outgoing connections may be considered a consumer. Based on the classification of consumer or provider, a rule set may be identified for the security threat, wherein the rule set may be associated with a response to the security threat. For example, if the asset is considered a provider, the rule set may define actions that prevent the initiation of outbound connections of the system, while limiting or removing the threat. In contrast, if the device is classified as a consumer, the rule set may define actions that can block inbound activity to asset, while limiting or removing the threat.

In some implementations, to define the classification of the computing asset, computing system 500 may determine the role that the device plays in the threat. These roles may include target, source, or infrastructure roles for the threat. For example, based on the information that triggered the threat, such as the transfer of an unknown process from one asset to another, computing system 500 may classify each of the assets involved in the transfer. The asset that initiated the transfer may be considered the source, and the destination asset may be considered the target. Once the classification is determined, a rule set and associated actions may be determined to respond to the threat. In the case of a source asset, actions may include limiting the outbound connections of the asset, whereas the target of a threat may be associated with actions to block communications from a source of a threat.

In addition to the classification of the computing assets, in some implementations, the assets may further be provided with a criticality level. This criticality level may modify the actions that are taken against a threat, wherein assets that are of a higher criticality level may be provided a different set of actions than assets that are of a lower criticality level.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating an advisement system to respond to security threats in a computing environment, the method comprising:
identifying a security threat for an asset in the computing environment, wherein the asset comprises one of a virtual or physical computing element;
obtaining supplemental information related to the security threat from one or more websites and/or databases;
in response to identifying the security threat, identifying one or more classifications for the asset in relation to other assets within the computing environment, wherein a classification of the one or more classifications comprising one of a consumer classification or a provider classification based on incoming and outgoing connections of the asset prior to the identification of the security threat is determined by:
determining a ratio of incoming connections to outgoing connections for the asset at a time prior to the security threat;
when the ratio indicates a greater number of incoming connections in comparison to outgoing connections, classifying the asset as a consumer classification; and
when the ratio indicates a lesser number of incoming connections in comparison to outgoing connections, classifying the asset as a provider classification;
identifying a criticality rating for the asset;
determining a rule set for the security threat based on the one or more classifications for the asset, the criticality rating for the asset, and the supplemental information, wherein the rule set defines a response to the security threat, the response comprising an automated action for implementation in the asset; and
initiating the response to the security threat based on the rule set.

2. The method of claim 1 wherein a second classification of the one or more classifications for the asset in relation to other assets within the computing environment comprises one of a target asset, a source asset, or an infrastructure asset.

3. The method of claim 1 wherein the criticality rating for the asset comprises a user defined criticality rating or a rating based on data accessible to the asset.

4. The method of claim 1 wherein initiating the response to the security threat based on the rule set comprises:
providing one or more action recommendations to an administrator of the computing environment based on the rule set; and
identifying a user selection of at least one action from the administrator; and
initiating implementation of the user selection in the computing environment.

5. The method of claim 1 wherein identifying the security threat for the asset in the computing environment comprises identifying the security threat for the asset in the computing environment based on a report from a security information and event management (SIEM) system.

6. An apparatus to respond to security threats in a computing environment, the apparatus comprising:
a processing system;
one or more non-transitory computer readable media; and
processing instructions stored on the one or more non-transitory computer readable media that, when executed by the processing system, direct the processing system to:
identify a security threat for an asset in the computing environment, wherein the asset comprises one of a virtual or physical computing asset;
obtaining supplemental information related to the security threat from one or more websites and/or databases;
in response to identifying the security threat, identify one or more classifications for the asset in relation to other assets within the computing environment, wherein a classification of the one or more classifications comprising one of a consumer classification or a provider classification based on incoming and outgoing connections of the asset prior to the identification of the security threat is determined by:
determining a ratio of incoming connections to outgoing connections for the asset at a time prior to the security threat;
when the ratio indicates a greater number of incoming connections in comparison to outgoing connections, classifying the asset as a consumer classification; and
when the ratio indicates a lesser number of incoming connections in comparison to outgoing connections, classifying the asset as a provider classification;
identify a criticality rating for the asset;
determine a rule set for the security threat based on the one or more classifications for the asset, the criticality rating for the asset, and the supplemental information, wherein the rule set defines a response to the security threat, the response comprising an automated action for implementation in the asset; and
initiate the response to the security threat based on the rule set.

7. The apparatus of claim 6 wherein a second classification of the one or more second classifications for the asset in relation to other assets within the computing environment comprises one of a target asset, a source asset, or an infrastructure asset.

8. The apparatus of claim 6 wherein the criticality rating for the asset comprises a user defined criticality rating or a rating based on data accessible to the asset.

9. The apparatus of claim 6 wherein the processing instructions to initiate the response to the security threat based on the rule set direct the processing system to:
provide one or more action recommendations to an administrator of the computing environment based on the rule set;
identify a user selection of at least one action from the administrator; and
initiate implementation of the user selection in the computing environment.

10. The apparatus of claim 6 wherein the processing instructions to identify the security threat for the asset in the computing environment direct the processing system to identify the security threat for the asset in the computing environment based on a report from a security information and event management (SIEM) system.

11. A system comprising:
a plurality of assets;
an advisement system configured to:
receive a notification of a security threat for an asset of the plurality of assets, wherein the asset comprises one of a virtual or physical computing element;

obtain supplemental information related to the security threat from one or more websites and/or databases;

identify one or more classifications of the asset in relation to the security threat, wherein a classification of the one or more classifications comprising one of a consumer classification or a provider classification based on incoming and outgoing connections of the asset prior to the identification of the security threat is determined by:
  determining a ratio of incoming connections to outgoing connections for the asset at a time prior to the security threat;
  when the ratio indicates a greater number of incoming connections in comparison to outgoing connections, classifying the asset as a consumer classification; and
  when the ratio indicates a lesser number of incoming connections in comparison to outgoing connections, classifying the asset as a provider classification;

identify a criticality rating for the asset;

determine a rule set for the security threat based on the one or more classifications of the asset, the criticality rating for the asset, and the supplemental information related to the security threat, wherein the rule set defines a response to the security threat, the response comprising an automated action for implementation in the asset; and initiate the response to the security threat based on the rule set.

12. The system of claim 11 wherein the criticality rating for the asset comprises a user defined criticality rating or a rating based on data accessible to the asset.

13. The system of claim 11 wherein a second classification of the one or more classifications for the asset in relation to the threat comprises one of a target asset, a source asset, or an infrastructure asset.

14. The system of claim 11 wherein the advisement system configured to initiate the response to the security threat based on the rule set is configured to:
  provide one or more action recommendations to an administrator based on the rule set; and
  identify a user selection of at least one action from the administrator; and
  initiate implementation of the user selection in at least one asset of the plurality of assets.

* * * * *